ó(12) United States Patent
Wood

(10) Patent No.: US 10,755,302 B2
(45) Date of Patent: Aug. 25, 2020

(54) METHODS AND APPARATUS TO DETERMINE INFORMED HOLDOUTS FOR AN ADVERTISEMENT CAMPAIGN

(71) Applicant: The Nielsen Company (US), LLC, New York, NY (US)

(72) Inventor: Leslie A. Wood, Copake, NY (US)

(73) Assignee: The Nielsen Company (US), LLC, New York, NY (US)

( * ) Notice: Subject to any disclaimer, the term of this patent is extended or adjusted under 35 U.S.C. 154(b) by 100 days.

(21) Appl. No.: 16/163,059

(22) Filed: Oct. 17, 2018

(65) Prior Publication Data

US 2019/0311396 A1   Oct. 10, 2019

Related U.S. Application Data

(60) Provisional application No. 62/654,685, filed on Apr. 9, 2018.

(51) Int. Cl.
G06Q 30/02 (2012.01)
(52) U.S. Cl.
CPC ..... G06Q 30/0245 (2013.01); G06Q 30/0255 (2013.01)
(58) Field of Classification Search
USPC .......................................................... 705/14
See application file for complete search history.

(56) References Cited

U.S. PATENT DOCUMENTS

2009/0030780 A1   1/2009 York et al.
2013/0006706 A1   1/2013 Harvey et al.
2015/0154672 A1   6/2015 Liptay et al.
2015/0363822 A1   12/2015 Rowe et al.
2017/0236135 A1   8/2017 Wood

FOREIGN PATENT DOCUMENTS

WO   2014065933   5/2014

OTHER PUBLICATIONS

International Searching Authority, "International Search Report," mailed in connection with International Patent Application No. PCT/US2019/026298, dated Jul. 26, 2019, 3 pages.
(Continued)

*Primary Examiner* — Afaf Osman Bilal Ahmed
(74) *Attorney, Agent, or Firm* — Hanley, Flight & Zimmerman, LLC

(57) ABSTRACT

Methods and apparatus are disclosed to determine informed holdouts for an advertisement campaign. An example storage medium includes instructions that, when executed, cause a machine to retrieve user identifiers associated with purchase instances; determine households that correspond to the user identifiers; identify a first and a second group type, the first group type exhibiting a first threshold of purchase behaviors, and the second group type exhibiting a second threshold of purchase behaviors; identify a first holdout group and a second holdout group, reduce computational lift calculation resource consumption by constraining the first holdout group to a first percentage, constraining the second holdout group to a second percentage, the first percentage equal to the second, the first and the second holdout groups are not to be exposed to an advertisement campaign; and determine a lift calculation for the advertisement campaign based on the first and the second holdout groups.

20 Claims, 4 Drawing Sheets

(56) References Cited

OTHER PUBLICATIONS

International Searching Authority, "Written Opinion," mailed in connection with International Patent Application No. PCT/US2019/026298, dated Jul. 26, 2019, 5 pages.

Berman et al., "Enhancing Power of Marketing Experiments using Observational Data," Mar. 14, 2018, 46 pages.

Keane et al., "Exploring the Usefullness of a Non-Random Holdout Sample for Model Validation: Welfare Effects on Female Behavior," May, 2005, 83 pages.

| HH SEGMENT | % OF TOTAL HH POPULATION | NUMBER OF HHs | HOLDOUT RATIO | NUMBER OF CONTROL (HOLDOUT) HHs | NUMBER OF TEST HHs |
|---|---|---|---|---|---|
| A | 25% | 31,250,000 | 20% | 6,250,000 | 25,000,000 |
| B | 45% | 56,250,000 | 20% | 11,250,000 | 45,000,000 |
| C | 30% | 37,500,000 | 20% | 7,500,000 | 30,000,000 |
| | | Σ=125,000,000 | | | |

FIG. 2

METHODS AND APPARATUS TO DETERMINE INFORMED HOLDOUTS FOR AN ADVERTISEMENT CAMPAIGN

CROSS-REFERENCE TO RELATED APPLICATIONS

This patent claims the benefit of and priority to previously filed U.S. Provisional Patent Application Ser. No. 62/654,685, filed on Apr. 9, 2018, which is entitled "METHODS AND APPARATUS TO DETERMINE INFORMED HOLDOUTS FOR AN ADVERTISEMENT CAMPAIGN." The subject matter of this application is incorporated herein by reference in its entirety.

FIELD OF THE DISCLOSURE

This disclosure relates generally to market strategy development and, more particularly, to methods and apparatus to determine informed holdouts for an advertisement campaign.

BACKGROUND

In recent years, consumer behavior data has become more accessible to market researchers. In some examples, the consumer behavior data is referred to as "big data" that includes information related to each consumer's buying behavior as well as other details about that particular consumer, such as demographic information and segment information. The consumer behavior data may originate from consumer panels, individual retailer data collection initiatives (e.g., frequent shopper data), data aggregators (e.g., Experian®), and/or combinations thereof.

BRIEF DESCRIPTION OF THE DRAWINGS

FIG. 2 is an example table representative of example holdout groups of households.

DETAILED DESCRIPTION

Figure 1:
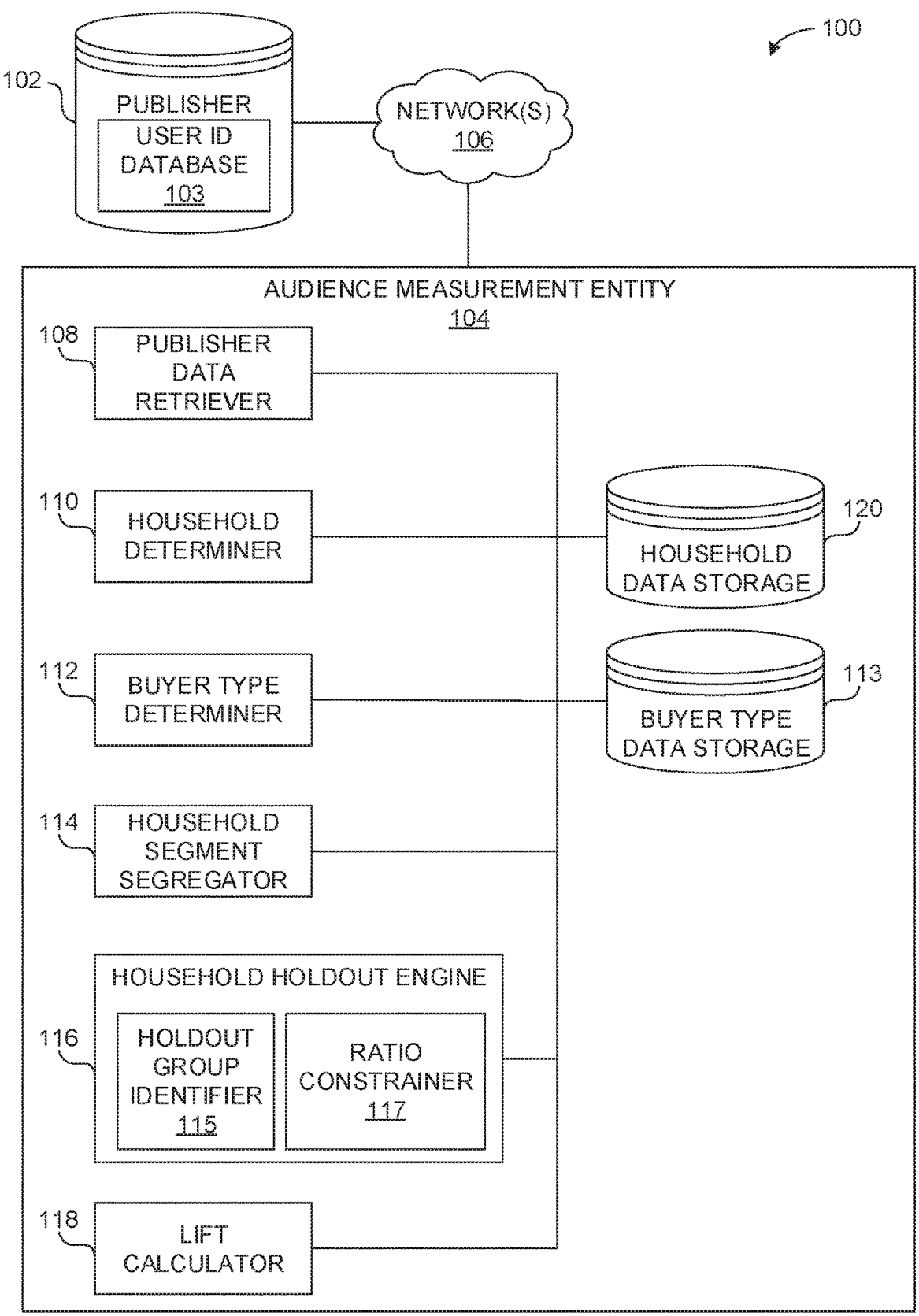
FIG. 1 is a schematic illustration of an example informed holdouts system constructed in accordance with the teachings of this disclosure.

There are several strategies employed by market researchers (e.g., advertising companies) in the technical field of market research to model the return on investment (ROI) of an advertisement campaign. For example, some strategies rely on selecting a holdout group of consumers. As used herein, a "holdout" or a "holdout group" defines a control group of consumers chosen (e.g., by the advertising company) that will not be exposed to the advertisement campaign. In some examples, a holdout group is randomly selected from a large group of consumers. In some examples, a holdout group is compared to a group including the rest of the population (e.g., a test group) that was exposed to the advertisement campaign. The purpose of applying holdouts to an advertisement campaign is to allow calculation of a lift for a particular advertisement campaign of interest. As used herein, "lift" defines a calculated value indicative of an effect caused by the campaign of interest and, in some examples, is based on a ratio of brand interaction before and after an advertisement campaign to determine a return on investment of the campaign. Stated differently, the lift calculation uses the holdout group in a manner that illustrates how purchasing behaviors would change for those consumers that were exposed to the campaign of interest as compared to those consumers that were not exposed to the campaign of interest.

However, current randomly selected holdout groups can be problematic in terms of their reliability as an accurate measure of return on investment (e.g., lift). In some circumstances, randomly selecting a holdout group could result in erroneous calculations of lift and, more specifically, an incorrect model of the advertisement campaign performance. In some circumstances, relying on randomly selected holdout groups causes computational waste in the technical field of market research that may require additional lift calculations (e.g., subsequent lift calculation efforts) to discover why the calculated lift values were erroneous. For example, randomly selecting a holdout group does not take into consideration that most consumers differ from one another. Consumers vary in regards to their purchase behaviors, demographics, responsiveness to advertisements, etc.

When a holdout group is randomly selected, the advertising company runs the risk of choosing a holdout group that includes consumers unrelated to one another (e.g., different purchase behaviors, different demographics, and different responsiveness to advertising). Furthermore, unless a holdout group is large, different levels of brand buying, category buying, purchase cycles, and receptivity to advertising may not be equal among a distribution of consumers within a holdout group and a test group (e.g., a group exposed to an advertisement campaign). However, while increasing a size of the holdout group may improve the equality of distribution between that holdout group and the test group, when the holdout group size for an advertisement campaign increases, a corresponding reach value (e.g., a value indicative of consumers that were exposed to the advertisement campaign) decreases (or is otherwise further limited) because all consumers within the holdout group will not be delivered advertising.

In such examples, the holdout group would not be reliable in determining a lift calculation, as the resulting indication of the performance of the advertisement campaign of interest would not represent similar purchase behaviors between (a) the selected holdout group and (b) the group of consumers that were exposed to the campaign. For example, different purchase buyer types randomly selected into the same holdout group may introduce substantial flaws in an advertisement campaign lift calculation, such as when considering a product like diapers. As a result of randomly selecting a holdout group for a diaper advertisement campaign, the holdout group may include unrelated buyers. For example, the randomly selected holdout group may include high category buyers with children and, thus, purchase a large amount of diapers on a consistent basis. On the other hand, the same holdout group may include non-category buyers (e.g., buyers that do not purchase diapers). Non-category buyers do not typically purchase diapers regardless of whether or not they were exposed to the diaper advertisement campaign. As such, including unrelated data in the lift calculation produces bias and/or erroneous results.

In taking the above example to a further extreme, the randomly selected holdout group may contain buyers with varying demographics and, more specifically, demographics affecting a buyer's responsiveness to advertising. For example, some demographic information (e.g., race, age, etc.) may indicate a buyer's level of cultural assimilation. In some circumstances, a buyer with a low level of cultural assimilation may be more responsive to advertising. Therefore, lift calculations resulting from the above example holdout group may be erroneous, biased and/or otherwise unreliable. The advertising company may need to perform further lift calculations and/or change variables within their calculations in an effort to correct the erroneous lift calculations. Performing additional lift calculations requires computational resources and processing power that must be consumed wastefully. Examples disclosed herein reduce iterative computational efforts during advertisement campaign lift calculations which frees up processing resources and system memory and, thus, improves power consumption of the system.

In some examples, the market researcher (e.g., an advertising company) is limited to client data that their consumers willingly provide. Client data may include various levels of demographic information (e.g., gender, race, age, income, occupation, etc.). Therefore, client data does not include information indicative of purchasing behavior and/or responsiveness to advertising corresponding to their consumers. Neglecting consumer purchasing behavior and/or consumer responsiveness to advertising may result in biased data that is unreliable and/or unsuitable for use with measuring the performance of an advertisement campaign. Accordingly, basing advertisement campaign performance calculations on limited client data (e.g., demographic information) may lead to inaccurate and unreliable campaign performance results.

Methods, apparatus, systems and/or articles of manufacture disclosed herein improve the accuracy of advertisement campaign modeling. The United States is estimated to include approximately 125 million households, which differ in purchase behaviors, demographics, responsiveness to advertising, etc. Examples disclosed herein segregate the 125 million households by determining household segments with similar purchase behaviors, demographics, responsiveness to advertising, etc. for use of applying a holdout group to an advertisement campaign of interest. The term consumer and buyer may be used interchangeably herein. Buying behavior types may include, but are not limited to category purchase intensity types (e.g., light category buyers, medium category buyers, heavy category buyers and/or non-category buyers). Additionally, purchaser buyer types may include brand purchase intensity types (e.g., low-loyalty brand buyers, medium-loyalty brand buyers (sometimes referred to herein as "switchers" due to an observed lack of purchase consistency for a single brand), high-loyalty brand buyers, and non-brand buyers). Light category buyers, medium category buyers, heavy category buyers and non-category buyers may be defined in relative terms for observed purchase occasions from a data set of interest during a time period of interest.

Examples disclosed herein segregate the buyers (e.g., consumers exposed to the brand to be measured) into groups based on how frequently they have purchased one or more products within the category of interest (e.g., a category purchase intensity metric). Behavioral data indicative of buyers of the brand to be measured (e.g., which consumers have purchased products from the brand to be measured) is typically only available to a third party audience measurement entity (e.g., The Nielsen Company, LLC). In some examples, even if advertising companies have detailed purchasing or behavioral information associated with their consumers, one or more privacy policies and/or jurisdictional codes (e.g., laws) prohibit the use of such behavioral information. Such use is particularly problematic when the behavioral information is explicitly ties to the associated demographic information.

Example heavy category buyers (e.g., a first group type) may reflect one-fourth ($\frac{1}{4}^{th}$) of consumer purchase occasions for those consumers that have purchased within the category the most number of times (relatively, or in view of a first relative threshold compared to other consumers that have purchased less frequently) within a time period of interest (e.g., within the past 1-year). The example medium category buyers (e.g., a second group type) reflect another portion (e.g., one-fourth) of participant purchase occasions for those consumers that have purchased within the category less than the heavy category, but more than a third segregated group reflecting the light category buyers (e.g., a third group type). Finally, yet another portion (e.g., one-fourth) of consumers (e.g., a fourth group type) may have purchased the category for the first time within a time-period of interest, such as the first time a consumer has purchased within the category of interest after not having any prior purchase occasions one year prior to that purchase instance. The size of each segment and the distribution of buyers across segments may vary based on the type of brand and/or category, and the needs of the advertising company objectives.

Additionally, for each category purchase type (e.g., category purchase intensity types of non-category buyers, light category buyers, medium category buyers, heavy category buyers), examples disclosed herein identify brand buyer types (e.g., brand purchase intensity types) within each category in relative terms. For example, a high brand loyalty buyer, a medium brand loyalty buyer (e.g., a "switcher"), and a low brand loyalty buyer may be determined based on relative purchase occasions within the brand of interest during the prior purchase period of interest (e.g., within the past 1-year time period).

Buyer type data indicative of consumer purchasing behavior (e.g., data pertaining to category purchase intensity types and/or brand purchase intensity types) is typically only available to a third party audience measurement entity (e.g., The Nielsen Company, LLC). As a result, the buyer type data is typically not accessible to a client of the third party audience measurement entity (e.g., an advertising company, a publisher, a social networking service, etc.), and the buyer type data is separate from client data. As described above, ownership and/or access to the buyer type data is strictly prohibited by jurisdictional rules/laws. In particular, clients of the third party audience measurement entity (e.g., an advertising company, a publisher, a social networking service, etc.) are restricted from accessing and/or owning the buyer type data. Such restrictions may be enforced by jurisdictional laws intended to protect personally identifiable information (PII). For example, client data may contain demographic information (e.g., gender, race, age, income, occupation, etc.). However, client data does not include information corresponding to purchase instances (e.g., the brand purchased, the date of purchase). Furthermore, client data does not include at least category purchase intensity types, brand purchase intensity types, responsiveness to advertising, etc., to comply with privacy safeguards and/or contracts between consumers and the audience measurement entity. In some examples, even if the client has particular types of data (e.g., data considered to be too invasive regarding purchaser behaviors, data considered to be personally identifiable information (PII), etc.), one or more jurisdictional rules/laws prevent the use of such data. Therefore, there is no circumstance in which the client may own and/or access the buyer type data without violating privacy safeguards and/or contracts, jurisdictional rules/laws, etc.

Accordingly, because examples disclosed herein calculate lift based on household segments with similar (a) buying behavior, (b) demographics, and (c) responsiveness to advertising, advertisement campaign modeling re-calculation efforts are reduced because granular household segments are now identified and segregated, thereby making the process of modeling the performance of an advertisement campaign more efficient and accurate. In other words, computational re-calculating of unsatisfactory and/or otherwise biased lift results is reduced.

FIG. 1 is a schematic illustration of an example informed holdouts system 100 constructed in accordance with the teachings of this disclosure. In the illustrated example of FIG. 1, a publisher 102 is communicatively coupled to an audience measurement entity 104 via a network 106. The example audience measurement entity 104 includes an example publisher data retriever 108, an example household determiner 110, an example buyer type determiner 112, an example buyer type data storage 113, an example household segment segregator 114, an example household holdout engine 116, an example lift calculator 118, and an example household data storage 120. The example household holdout engine 116 further includes an example holdout group identifier 115 and an example ratio constrainer 117. The example household determiner 110 is communicatively coupled to the example household data storage 120. The example buyer type determiner 112 is communicatively coupled to the example buyer type data storage 113.

In the illustrated example of FIG. 1, the publisher 102 is a service provider for a large number of subscribers. For example, the publisher 102 may be a social networking service (e.g., Facebook). In exchange for the provision of the service, the subscribers register with the publisher 102. As part of the registration process, the subscribers provide user information (e.g., a name, an email address, a street address, etc.) and/or demographic information (e.g., gender, race, age, income, occupation, etc.). Based on the registration process, the publisher 102 includes a user ID database 103. The user ID database 103 includes all user IDs (identifiers) corresponding to the subscribers that are registered with the publisher 102.

In operation, the publisher 102 notifies the audience measurement entity 104 of a brand to be measured and a corresponding advertisement campaign. In some examples, the audience measurement entity 104 queries and/or otherwise retrieves measurement tasks from the publisher 102 on a scheduled, periodic, aperiodic, or manual basis. As used herein, a brand to be measured is a brand for which a lift calculation is to be performed after an advertisement campaign (e.g., an online advertisement, a television advertisement, a radio advertisement, etc.) is completed. For example, an advertising company may request that the publisher 102 completes an advertisement campaign corresponding to a brand on a service (e.g., Facebook social networking site). Typically, the publisher 102 does not include certain information (e.g., consumer buying characteristics, responsiveness to advertising) needed to complete an accurate lift calculation for the brand to be measured. In fact, the publisher 102 is typically prevented from having and/or retaining certain types of information related to their subscribers/participants. Such restrictions may be enforced by jurisdictional laws intended to protect personally identifiable information (PII). In some examples, the publisher 102 does not acquire or retain certain types of information as a gesture of good-will and trust for its subscribers/participants. Instead, the publisher 102 typically has user IDs and corresponding purchase data (e.g., the brand purchased, the date of purchase, etc.). As a result of the lack of such information, the publisher 102 seeks further information corresponding to respective ones of the user IDs that would be appropriate for a holdout group, but in a manner that does not inappropriately disclose such information. As described above, this lack of knowledge of which ones of consumers to select for a holdout group typically causes market researchers to utilize random selection techniques, which fail to provide a proper comparison for lift calculation purposes, thereby leading to erroneous results.

The example audience measurement entity 104 invokes the example publisher data retriever 108 to query the publisher 102 to transfer the user IDs associated with the respective subscribers of the publisher 102 and a brand to be measured. In some examples, the publisher data retriever 108 is a means for retrieving or a retrieving means, which is hardware. The example household determiner 110 retrieves the user IDs from the publisher data retriever 108, and transfers the user IDs to the example household data storage 120 (for subsequent matching of user IDs to particular segment type information). The example household data storage 120 includes all of the households, respective inhabitants and corresponding user IDs. The data stored in the example household data storage 120 (which is not accessible or otherwise known to the publisher 102) may originate from any number of data sources (independent of the publisher 102) including but not limited to, panelist data sources (managed panels, Homescan®, etc.), third party data aggregators (e.g., Experian®), etc. Based on the data stored in the example household data storage 120, the example household determiner 110 matches each user ID retrieved from the publisher 102 to a respective household. As a result, the example household determiner 110 is able to match demographic and/or behavioral information (e.g., purchase instances) to each user ID. In some examples, the household determiner 110 is a first means for determining or a first determining means, which is hardware. While beyond the scope of this patent, user IDs sourced by the publisher 102 may be hashed by one or more hashing algorithms to generate a unique hash value. As such, disclosure of PII is reduced, minimized and/or otherwise prevented. Similarly, the household data stored in the household data storage 120 is sourced from data sources that also hashed user IDs using the same hashing algorithm. Because the same input applied to the same hashing algorithm produces an identical unique output, matching operations may proceed without risk to the PII of the user(s).

In the illustrated example of FIG. 1, the buyer type determiner 112 retrieves the household data associated with the respective demographics and/or behavioral information from the household determiner 110. The buyer type determiner 112 retrieves buyer type data from the buyer type data storage 113 (e.g., data from managed panels, Homescan®, Experian®, frequent shopper data, survey data, etc.) and segregates the buyer type data to generate category buyer type subgroups and brand buyer types associated with the brand to be measured. In some examples, the category buyer type subgroups and/or the brand buyer types are indicative of candidate user identifiers. As discussed above, the publisher 102 is not privy to and/or does not have access to the buyer type data associated with the user IDs in the interest of contractual and/or law-based restrictions. To generate category buyer types, the buyer type determiner 112 retrieves, from the buyer type data storage 113, a prior purchase period of interest indicative of a duration in which products of a brand were sold. The buyer type determiner 112 segregates subgroups for non-category buyers, which reflects those buyers that have not purchased a product within the category within the prior purchase period (e.g., no category purchases within the past 1-year period). With the remaining buyers, which have purchased within the category at least one time in the prior purchase period of interest, the buyer type determiner 112 ranks and/or identifies the remaining buyers by how frequently they have purchased within the category of interest.

In other words, some buyers are associated with the light category buyer subgroup if they have only purchased one or two products (e.g., a first threshold amount) within the category of interest in the prior purchase period of interest, while some buyers are associated with the heavy category buyer subgroup if they have purchased ten or more products (e.g., a second threshold amount) within the category of interest in the prior purchase period of interest. In some examples, the buyer type determiner 112 identifies substantially similar sized subgroups for light category buyers, medium category buyers and heavy category buyers. While examples disclosed herein refer to light category buyers, medium category buyers and heavy category buyers, examples disclosed herein are not limited thereto. Instead, examples disclosed herein may develop segregated groups of any granularity related to (but not limited to) purchase behaviors, brand-specific purchase behaviors, demographics, responsiveness to advertising measures and/or combinations thereof. Responsiveness to advertising may be associated with demographics or prior history of responsiveness to advertising from similar or different types of advertisement campaigns.

To generate brand buyer types associated with each category of interest, the buyer type determiner 112 selects one of the category buyer subgroups (e.g., a light category buyer subgroup, a medium category buyer subgroup, a heavy category buyer subgroup). The buyer type determiner 112 identifies a subgroup of buyers from the buyer type data storage 113 that have purchased the brand to be measured with a prior purchase period of interest, such as a buyer that has not had any prior purchases of the brand to be measured within the last one-year time period (e.g., a non-brand buyer). After identifying the non-brand buyers, the buyer type determiner 112 ranks the remaining purchasers according to their brand purchase frequency during the prior purchase period of interest. For example, assuming the instant analysis is for buyers that have been identified as light category buyers, the buyer type determiner 112 determines which ones of those buyers are deemed low loyalty brand buyers, switchers, and high loyalty brand buyers. In some examples, the buyer type determiner 112 divides the ranked buyers into three equal subgroups and those in the top one-third (or any other threshold of interest) reflect the high loyalty subcategory. That is, the high loyalty subcategory identifies buyers that exhibit the relatively highest frequency of purchase for the brand to be measured. The next lowest one-third of the ranked list reflects a subgroup referred to as switchers, which exhibit a relatively lower purchase frequency of the brand to be measured during the prior purchase period of interest and have a higher likelihood or switching between brands. Finally, the lowest one-third of the ranked list reflects the subcategory referred to as low loyalty brand buyers. The buyer type determiner 112 then generates intersections between category buyer types (e.g., light category buyers, medium category buyers, heavy category buyers), non-category buyers, non-brand buyers, low-loyalty brand buyers, switchers, and high-loyalty brand buyers. The intersections generated by the buyer type determiner 112 are referred to herein as buyer type data. In some examples, the buyer type determiner 112 is a second means for determining or a second determining means, which is hardware.

The example household segment segregator 114 retrieves the buyer type data from the buyer type determiner 112. The example household segment segregator 114 creates household segments with similar attributes that may include, but are not limited to the buyer type data, buyer demographic information, and buyer responsiveness to advertising. Demographic information may include, but is not limited to gender, age, race, income, home location, occupation, etc. Buyer responsiveness to advertising may be categorized by a level of cultural assimilation of a buyer. For example, some demographic information (e.g., race, age, etc.) may indicate a buyer's level of cultural assimilation. For example, a language that a household television is tuned to during a majority of a time period (e.g., at least 50% of the time period) may be indicative of a dominant language spoken in a household. In some examples, a higher percentage of time during the time period that a household television is tuned to a non-native language (e.g., not English) is indicative of a lower level of cultural assimilation for the household. In other words, the use of a non-native language is proportional to a household's cultural assimilation. In some circumstances, a buyer with a low level of cultural assimilation may be more responsive to advertising. Buyer responsiveness to advertising information may also be derived from other sources such as, but not limited to, prior behavior or other characteristics that indicate a higher response to advertising. In some examples, the example household segment segregator 114 combines the buyer type data, demographic information, and responsiveness to advertising to create household segments that are considered similar. For example, the household segment segregator 114 may create a household segment comprising medium category buyers, high-loyalty brand buyers, buyers of the same race and income level, and buyers with a low level of cultural assimilation. In the previous example, the generated household segment includes similar buyers and, thus, is deemed a balanced data set. In some examples, the household segment segregator 114 is a means for segregating or a segregating means, which is hardware.

In the illustrated example of FIG. 1, the example household holdout engine 116 includes the example holdout group identifier 115 and the example ratio constrainer 117. The household holdout engine 116 receives the generated household segments from the household segment segregator 114. In response, the example holdout group identifier 115 identifies, for a first household segment, a first segment holdout group that will not be exposed to an advertisement campaign associated with the brand to be measured. In some examples, the example holdout group identifier 115 identifies, for a first category buyer type group, a first holdout group that will not be exposed to an advertisement campaign associated with the brand to be measured. In some examples, the example holdout group identifier 115 is a means for identifying or an identifying means, which is hardware. Additionally, examples disclosed herein identify a same and/or otherwise consistent holdout percentage (e.g., a holdout ratio) from one household segment of interest (e.g., medium category buyers for the brand of interest) to another household segment of interest (e.g., heavy category buyers for the brand of interest) during the campaign. Generally speaking, another source of error caused by traditional holdout group selection using a random selection process relates to inconsistent holdout group percentages (e.g., ratios) between the segments of interest. Accordingly, examples disclosed herein direct holdout groups to households exhibiting similar purchasing behaviors as well as consistent holdout percentages among the segments of interest.

As described above, one or more holdout group(s) are determined, in some examples, by applying the same holdout ratio (e.g., percentage) of households within each household segment and/or category buyer type group of interest. For example, the household holdout engine 116 constrains each category buyer type group and/or household segment to a 20% holdout ratio. In other words, 1 of every 5 buyers in a respective household segment and/or category buyer type group will not be exposed to the advertisement campaign associated with the brand to be measured. In some examples, the ratio constrainer 117 is a means for constraining or a constraining means, which is hardware. This holdout ratio will be described in more detail in connection with FIG. 2. In alternative examples, any holdout ratio can be applied to the household segments and/or category buyer type group. Furthermore, the segment holdout group and/or the holdout group is balanced because all buyers within a household segment of interest and/or category buyer type group are similar and thus, applying the same holdout ratio across all household segments and/or category buyer type group will result in balanced holdout groups. After the household holdout engine 116 determines a consistent holdout ratio (e.g., percentage) to use, the audience measurement entity 104 transfers, to the publisher 102 via the network 106, similar household segments including the respective user IDs and a consistent holdout ratio (e.g., percentage) to accurately model an advertisement campaign associated with the brand to be measured.

Once the publisher 102 completes an advertisement campaign for a brand to be measured, the publisher data retriever 108 retrieves control IDs (e.g., control group), test IDs (e.g., test group), and exposed IDs (e.g., exposed group) from the publisher 102. As used herein, "Control IDs" are users/households that were not exposed to the advertisement campaign associated with the brand to be measured. As used herein, "Test IDs" are users/households that were chosen to be exposed to the advertisement campaign associated with the brand to be measured. As used herein, "Exposed IDs" are users that were exposed to the advertisement campaign associated with the brand to be measured, as not all test IDs that were chosen to be exposed to the advertisement campaign were actually exposed by users/households. For example, some test IDs may be associated with households that were targeted by the campaign, but did not consume (e.g., watch) the advertisement campaign and, thus, were not exposed to the campaign.

The example lift calculator 118 retrieves the control group IDs, test group IDs, and exposed group IDs from the example publisher data retriever 108 to calculate a segment lift value for respective ones of the household segments. In some examples, the lift calculator 118 calculates a lift value for respective ones of the category buyer type groups identified by the buyer type determiner 112. In some examples, the lift calculator 118 determines an All Outlet Adjustment (AOA) factor by extrapolating panelist data. In such examples, the lift calculator 118 calculates a lift value for a household segment and/or category buyer type group by multiplying the number of households in the exposed group by the AOA factor. Once a segment lift value and/or lift value is calculated for each household segment and/or category buyer type group, the lift calculator 118 calculates a total lift value for the brand to be measured by summing the segment lift values and/or lift values of all household segments and/or category buyer type groups. In some examples, the lift calculator 118 is a means for calculating or a calculating means, which is hardware.

FIG. 2 is an example table 200 representative of holdout groups (e.g., a control groups) of households, in which the holdout groups are calculated by the example household holdout engine 116. In some examples, the example household holdout engine 116 generates the example table 200. In the illustrated example of FIG. 2, the total household (HH) population 250 is 125,000,000. The table 200 includes an example household (HH) segment column 202, an example percentage of total HH population column 204, an example number of HHs column 206, an example holdout ratio column 208, an example number of control (holdout) HHs column 210, and an example number of test HHs column 212. In the illustrated example of FIG. 2, the household segment column 202 includes an example household segment A 214, an example household segment B 216, and an example household segment C 218.

In the illustrated example of FIG. 2, the household segment segregator 114 segregates household segment A 214 to include 25% of the total household population, equaling 31,250,000 households. The household segment segregator 114 segregates household segment B 216 to include 45% of the total household population, equaling 56,250,000 households. The household segment segregator 114 segregates segment C 218 to include 30% of the total household population, equaling 37,500,000 households. In other examples, any number of household segments and any percentages of total household population may be used. In the illustrated example of FIG. 2, the ratio constrainer 117 applies an example holdout ratio 220 to household segment A 214, household segment B 216, and household segment C 218. In some examples, the example holdout ratio 220 is constrained to be (by the ratio constrainer 117) the same percentage (e.g., 20%) for all household segments in the table 200. The ratio constrainer 117 constrains the holdout ratio to the same percentage for all household segments to improve the accuracy of buyer type data, reduce bias caused by unbalanced holdout groups, and ultimately reduce a number of lift recalculation efforts that are otherwise caused to occur when bias is detected. In other examples, any percentage may be used for the holdout ratio 220.

The number of control HHs column 210 is calculated by the household holdout engine 116 by multiplying the number of HHs column 206 by the holdout ratio column 208 for each household segment, respectively. The number of test HHs column 212 is calculated by the household holdout engine 116 by subtracting the number of control HHs column 210 from the number of HHs column 206 for each household segment, respectively. Applying an equal holdout ratio 220 for household segment A 214, household segment B 216, and household segment C 218 reduces, minimizes and/or otherwise prevents erroneous and/or biased data.

While an example manner of implementing the informed holdouts system 100 of FIG. 1 is illustrated in FIGS. 1 and 2, one or more of the elements, processes and/or devices illustrated in FIGS. 1 and 2 may be combined, divided, re-arranged, omitted, eliminated and/or implemented in any other way. Further, the example publisher data retriever 108, the example household determiner 110, the example buyer type determiner 112, the example buyer type data storage 113, the example household segment segregator 114, the example holdout group identifier 115, the example household holdout engine 116, the example ratio constrainer 117, the example lift calculator 118, the example household data storage 120 and/or, more generally, the example informed holdouts system 100 of FIGS. 1 and 2 may be implemented by hardware, software, firmware and/or any combination of hardware, software and/or firmware. Thus, for example, any of the example publisher data retriever 108, the example household determiner 110, the example buyer type determiner 112, the example buyer type data storage 113, the example household segment segregator 114, the example holdout group identifier 115, the example household holdout engine 116, the example ratio constrainer 117, the example lift calculator 118, the example household data storage 120 and/or, more generally, the example informed holdouts system 100 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, publisher data retriever 108, the example household determiner 110, the example buyer type determiner 112, the example buyer type data storage 113, the example household segment segregator 114, the example holdout group identifier 115, the example household holdout engine 116, the example ratio constrainer 117, the example lift calculator 118, the example household data storage 120 is/are hereby expressly defined to include a non-transitory computer readable storage device or storage disk such as a memory, a digital versatile disk (DVD), a compact disk (CD), a Blu-ray disk, etc. including the software and/or firmware. Further still, the example informed holdouts system 100 of FIG. 1 may include one or more elements, processes and/or devices in addition to, or instead of, those illustrated in FIGS. 1 and 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
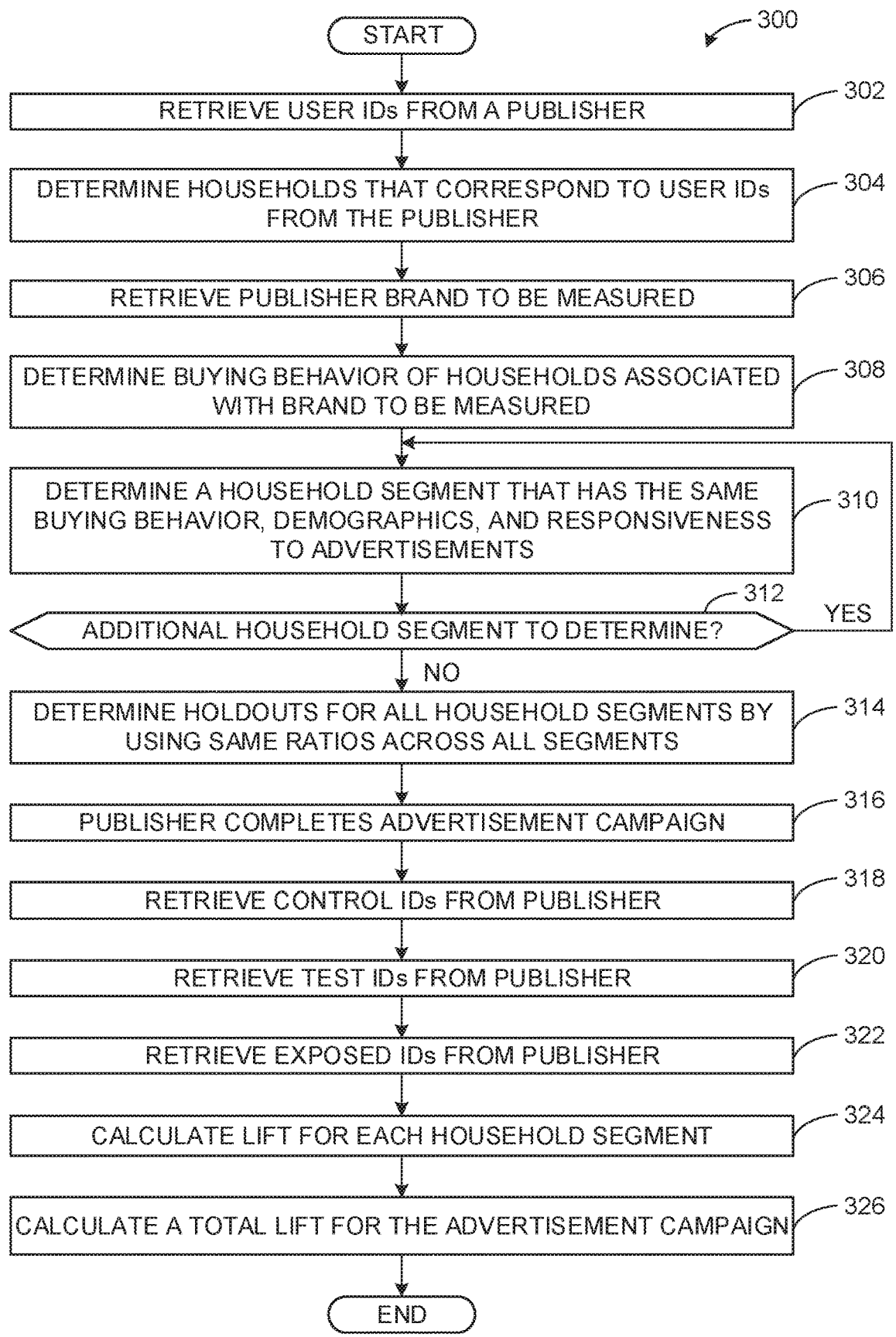
FIG. 3 is a flowchart representative of example machine readable instructions that may be executed to implement the example informed holdouts system of FIG. 1.

A flowchart representative of example hardware logic or machine readable instructions for implementing the informed holdouts system 100 of FIGS. 1 and 2 is shown in FIG. 3. The machine readable instructions may be a program or portions of a program for execution by a processor such as the processor 412 shown in the example processor platform 400 discussed below in connection with FIG. 4. The program may be embodied in software stored on a non-transitory computer readable storage medium such as a CD-ROM, a floppy disk, a hard drive, a DVD, a Blu-ray disk, or a memory associated with the processor 412, but the entire program and/or parts thereof could alternatively be executed by a device other than the processor 412 and/or embodied in firmware or dedicated hardware. Further, although the example program is described with reference to the flowchart illustrated in FIG. 2, many other methods of implementing the example informed holdouts system 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIG. 3 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C.

The program 300 of FIG. 3 begins at block 302 where the example publisher data retriever 108 queries the example publisher 102 to transfer the user IDs associated with the respective subscribers of the example publisher 102. In response to the query, the example publisher data retriever 108 retrieves the user IDs from the example publisher 102. The example household determiner 110 retrieves the user IDs from the example publisher data retriever 108. The example household determiner 110 accesses the household data storage 120 to receive information corresponding to the user IDs and households associated with the user IDs, respectively. Based on the data retrieved from the household data storage 120, the household determiner 110 links each user ID (indicative of a respective user/person) retrieved from the example publisher 102 to a respective household in which the user associated with the user ID resides (block 304). The example publisher data retriever 108 queries the example publisher 102 to identify a brand to be measured (block 306). The example buyer type determiner 112 determines buying behavior of households by generating category buyer type subgroups and brand buyer types associated with the brand to be measured (e.g., associated with the previously identified brand of interest) (block 308). As described above, each household may be associated with a particular category buyer type including, but not limited to, low-loyalty buyers, medium-loyalty buyers (e.g., "switchers"), high-loyalty buyers, etc.

The example household segment segregator 114 retrieves the buyer type data from the buyer type determiner 112. The example household segment segregator 114 determines household segments with similar purchase behavior, demographic information, and responsiveness to advertising (block 310). At block 312, the example household segment segregator 114 determines if any additional household segments need to be determined. If, at block 312, the example household segment segregator 114 determines that an additional household segment needs to be determined, then control proceeds back to block 310 to determine a household segment with similar purchase behavior, demographic information, and responsiveness to advertising. If, at block 312, the example household segment segregator 114 determines that no additional household segments need to be determined, then, at block 314, the example holdout group identifier 115 determines holdouts for all household segments and/or category buyer type groups by using and/or otherwise constraining the same holdout ratio (determined by the example ratio constrainer 117) to be applied across all segments and/or category buyer type groups.

Now that the households have been identified with corresponding segments, the publisher can use recommended holdout groups so that a campaign can target the most appropriate households, as well as target which households should not be exposed to the campaign, thereby improving later accuracy when lift calculations are performed. In some examples, the advertisement campaign is completed by the example publisher 102 (block 316). The example publisher data retriever 108 retrieves holdout IDs, test IDs, and exposed IDs from the publisher 102 (blocks 318, 320, 322). The lift calculator 118 then calculates a segment lift value and/or lift value for each household segment and/or category buyer type (block 324). At block 326, the lift calculator 118 calculates a total lift value for the advertisement campaign by summing the segment lift values and/or lift values of all household segments and/or category buyer type groups and the process ends.

Figure 4:
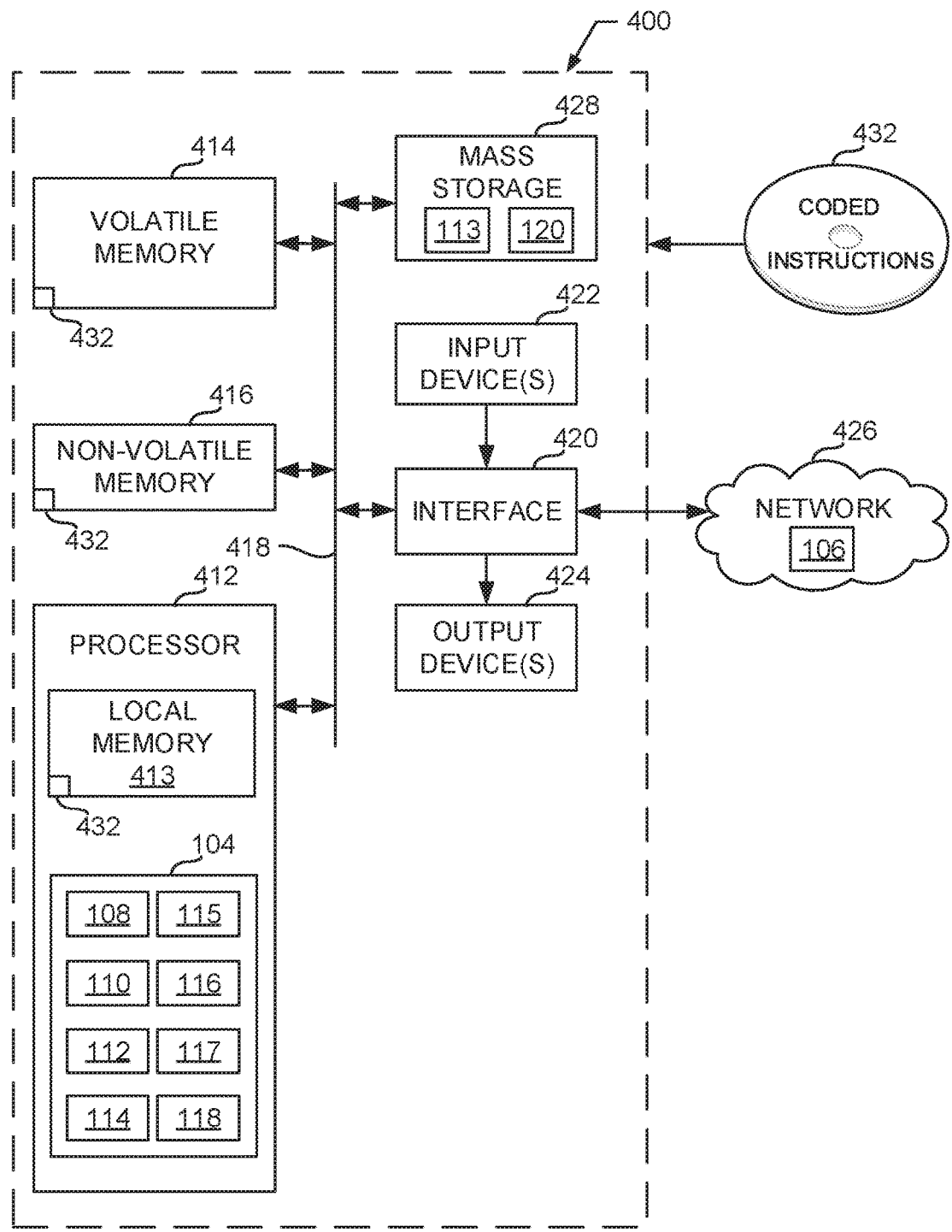
FIG. 4 is a block diagram of an example processing platform structured to execute the instructions of FIG. 3 to implement the example informed holdouts system of FIG. 1.

FIG. 4 is a block diagram of an example processor platform 400 structured to execute the instructions of FIG. 3 to implement the informed holdouts system 100 of FIGS. 1 and 2. The processor platform 400 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a set top box, or any other type of computing device.

The processor platform 400 of the illustrated example includes a processor 412. The processor 412 of the illustrated example is hardware. For example, the processor 412 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example publisher data retriever 108, the example household determiner 110, the example buyer type determiner 112, the example household segment segregator 114, the example holdout group identifier 115, the example household holdout engine 116, the example ratio constrainer 117, and the example lift calculator 118.

The processor 412 of the illustrated example includes a local memory 413 (e.g., a cache). The processor 412 of the illustrated example is in communication with a main memory including a volatile memory 414 and a non-volatile memory 416 via a bus 418. The volatile memory 414 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 416 may be implemented by flash memory and/or any other desired type of memory device. Access to the main memory 414, 416 is controlled by a memory controller.

The processor platform 400 of the illustrated example also includes an interface circuit 420. The interface circuit 420 may be implemented by any type of interface standard, such as an Ethernet interface, a universal serial bus (USB), a Bluetooth® interface, a near field communication (NFC) interface, and/or a PCI express interface.

In the illustrated example, one or more input devices 422 are connected to the interface circuit 420. The input device(s) 422 permit(s) a user to enter data and/or commands into the processor 412. The input device(s) can be implemented by, for example, a keyboard, a button, a mouse, a touchscreen, a track-pad, a trackball, isopoint and/or a voice recognition system.

One or more output devices 424 are also connected to the interface circuit 420 of the illustrated example. The output devices 424 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 420 of the illustrated example, thus, typically includes a graphics driver card, a graphics driver chip and/or a graphics driver processor.

The interface circuit 420 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 426. The communication can be via, for example, an Ethernet connection, a digital subscriber line (DSL) connection, a telephone line connection, a coaxial cable system, a satellite system, a line-of-site wireless system, a cellular telephone system, etc.

The processor platform 400 of the illustrated example also includes one or more mass storage devices 428 for storing software and/or data. Examples of such mass storage devices 428 include floppy disk drives, hard drive disks, compact disk drives. Blu-ray disk drives, redundant array of independent disks (RAID) systems, and digital versatile disk (DVD) drives.

The machine executable instructions 432 of FIG. 3 may be stored in the mass storage device 428, in the volatile memory 414, in the non-volatile memory 416, and/or on a removable non-transitory computer readable storage medium such as a CD or DVD.

From the foregoing, it will be appreciated that above methods, apparatus and articles of manufacture improve the accuracy of advertisement campaign modeling. Current advertisement campaign models use randomly selected holdout groups that are not derived from a balanced data set. Examples disclosed herein determine household segments with similar buying behaviors, demographics, responsiveness to advertising, etc. for use of applying a holdout group to an advertisement campaign of interest. Prior methods of advertisement campaign modeling may lead to erroneous lift values which, in turn, may result in further lift calculations and/or a change of variables within the calculations in an effort to correct the erroneous results. Performing additional lift calculations requires computational resources and processing power that must be consumed wastefully. Examples disclosed herein reduce iterative computational efforts during advertisement campaign lift calculations by generating more granular and accurate household segments for use in holdouts. By reducing iterative computational efforts during advertisement lift calculations, examples disclosed herein free up processing resources and system memory, and, thus, improve power consumption of the system.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to reduce iterative computation efforts for an advertisement campaign, the apparatus comprising:
    a publisher data retriever to retrieve, from a publisher, user identifiers associated with purchase instances;
    a household determiner to determine households that correspond to respective ones of the user identifiers;
    a buyer type determiner to determine a first group type and a second group type, the first group type associated with respective user identifiers exhibiting a first threshold of purchase behaviors, and the second group type associated with respective user identifiers exhibiting a second threshold of purchase behaviors;
    a holdout group identifier to identify a first holdout group of the user identifiers of the first group type and a second holdout group of the user identifiers of the second group type, the first and second holdout groups indicative of candidate user identifiers to be prevented from exposure to the advertisement campaign;
    a ratio constrainer to:
        reduce computational lift calculation resource consumption by constraining the first holdout group to a first percentage of the first group type; and
        constrain the second holdout group to a second percentage of the second group type, the first percentage equal to the second percentage; and
    a lift calculator to calculate a lift value for the advertisement campaign based on the first and the second holdout groups that are not exposed to the advertisement campaign.

2. The apparatus as defined in claim 1, further including a household segment segregator to segregate the households into household segments, respective ones of the household segments corresponding to respective ones of the households with at least one of similar purchase behaviors, similar demographics, or similar responsiveness to advertising.

3. The apparatus as defined in claim 2, wherein the holdout group identifier is to identify a segment holdout group for respective ones of the household segments that are not to be exposed to the advertisement campaign.

4. The apparatus as defined in claim 2, wherein the lift calculator is to calculate segment lift values corresponding to the household segments.

5. The apparatus as defined in claim 4, wherein the lift calculator is to calculate a total lift value for the advertisement campaign based on summing the segment lift values for respective ones of the household segments.

6. The apparatus as defined in claim 1, wherein the publisher data retriever is to retrieve, from the publisher, at least one of control group user identifiers, test group user identifiers, or exposed group user identifiers.

7. The apparatus as defined in claim 6, wherein the lift calculator is to:
    determine an All Outlet Adjustment factor by extrapolating panelist data from an audience measurement entity; and
    apply the All Outlet Adjustment factor to the lift value for the advertisement campaign.

8. A system to reduce iterative computation efforts for an advertisement campaign, the system comprising:
    means for retrieving, from a publisher, user identifiers associated with purchase instances;
    first means for determining households that correspond to respective ones of the user identifiers;
    second means for determining a first group type and a second group type, the first group type associated with respective user identifiers exhibiting a first threshold of purchase behaviors, and the second group type associated with respective user identifiers exhibiting a second threshold of purchase behaviors;
    means for identifying a first holdout group of the user identifiers of the first group type and a second holdout group of the user identifiers of the second group type, the first and second holdout groups indicative of candidate user identifiers to be prevented from exposure to the advertisement campaign;
    means for constraining to:
        reduce computational lift calculation resource consumption by constraining the first holdout group constrained to a first percentage of the first group type;
        constrain the second holdout group to a second percentage of the second group type, the first percentage equal to the second percentage; and
    means for calculating a lift value for the advertisement campaign based on the first and the second holdout groups that are not exposed to the advertisement campaign.

9. The system as defined in claim 8, further including means for segregating the households into household segments, respective ones of the household segments corresponding to respective ones of the households with at least one of similar buying behavior, similar demographics, or similar responsiveness to advertising.

10. The system as defined in claim 9, wherein the means for identifying is to identify a segment holdout group for respective ones of the household segments that are not to be exposed to the advertisement campaign.

11. The system as defined in claim 9, wherein the means for calculating is to calculate segment lift values corresponding to the household segments.

12. The system as defined in claim 11, wherein the means for calculating is to calculate a total lift value for the advertisement campaign based on summing the segment lift values for respective ones of the household segments.

13. The system as defined in claim 8, wherein the means for retrieving is to retrieve, from the publisher, at least one of control group user identifiers, test group user identifiers, or exposed group user identifiers.

14. The system as defined in claim 13, wherein the means for calculating is to:
    determine an All Outlet Adjustment factor by extrapolating panelist data from an audience measurement entity; and
    apply the All Outlet Adjustment factor to the lift value for the advertisement campaign.

15. A non-transitory computer readable storage medium comprising instructions that, when executed, cause a processor to at least:
    retrieve, from a publisher, user identifiers associated with purchase instances;
    determine households that correspond to respective ones of the user identifiers;
    determine a first group type and a second group type, the first group type associated with respective user identifiers exhibiting a first threshold of purchase behaviors, and the second group type associated with respective user identifiers exhibiting a second threshold of purchase behaviors;

identify a first holdout group of the user identifiers of the first group type and a second holdout group of the user identifiers of the second group type, the first and second holdout groups indicative of candidate user identifiers to be prevented from exposure to an advertisement campaign;

reduce computational lift calculation resource consumption by constraining the first holdout group to a first percentage of the first group type;

constrain the second holdout group to a second percentage of the second group type, the first percentage equal to the second percentage; and calculate a lift value for the advertisement campaign based on the first and the second holdout groups that are not to be exposed to the advertisement campaign.

16. The computer readable storage medium as defined in claim 15, wherein the instructions, when executed, cause the processor to segregate the households into household segments, respective ones of the household segments corresponding to respective ones of the households with at least one of similar buying behavior, similar demographics, or similar responsiveness to advertising.

17. The computer readable storage medium as defined in claim 16, wherein the instructions, when executed, cause the processor to identify a segment holdout group for respective ones of the household segments that are not to be exposed to the advertisement campaign.

18. The computer readable storage medium as defined in claim 16, wherein the instructions, when executed, cause the processor to determine segment lift values corresponding to the household segments.

19. The computer readable storage medium as defined in claim 18, wherein the instructions, when executed, cause the processor to calculate a total lift value for the advertisement campaign based on summing the segment lift values for respective ones of the household segments.

20. The computer readable storage medium as defined in claim 15, wherein the instructions, when executed, cause the processor to retrieve, from the publisher, at least one of control group user identifiers, test group user identifiers, or exposed group user identifiers.

* * * * *